United States Patent [19]

Hayden

[11] Patent Number: 5,666,519
[45] Date of Patent: Sep. 9, 1997

[54] METHOD AND APPARATUS FOR DETECTING AND EXECUTING CROSS-DOMAIN CALLS IN A COMPUTER SYSTEM

[75] Inventor: Peter C. Hayden, Mont Vernon, N.H.

[73] Assignee: Digital Equipment Corporation, Maynard, Mass.

[21] Appl. No.: 721,842

[22] Filed: Sep. 30, 1996

Related U.S. Application Data

[63] Continuation of Ser. No. 523,917, Sep. 6, 1995, which is a continuation of Ser. No. 207,453, Mar. 8, 1994.

[51] Int. Cl.$^6$ .................................................. G06F 9/00
[52] U.S. Cl. ........................... 395/500; 395/684; 395/580
[58] Field of Search ............................. 395/500, 684, 395/580

[56] References Cited

U.S. PATENT DOCUMENTS

| | | | |
|---|---|---|---|
| 4,503,492 | 3/1985 | Pilat | 395/700 |
| 5,210,832 | 5/1993 | Maier et al. | 395/375 |
| 5,210,874 | 5/1993 | Karger | 395/650 |
| 5,287,490 | 2/1994 | Sites | 395/500 |
| 5,307,504 | 4/1994 | Robinson et al. | 395/800 |
| 5,339,422 | 8/1994 | Brender et al. | 395/700 |
| 5,471,615 | 11/1995 | Amatsu et al. | 395/200.03 |
| 5,497,463 | 3/1996 | Stein et al. | 395/200.03 |

FOREIGN PATENT DOCUMENTS

WO92/15961  9/1992  WIPO.

OTHER PUBLICATIONS

"Using Registers to Optimize Cross-Domain Call Performance", P. A. Karger, 17(1989) Apr., Computer Architecture News, No. 2, New York.

"Speed System Operation By Matching CPU To Need", D. Mann, 40 (1992) Nov. 2, Electronic Design, No. 22, Cleveland, OH.

*Primary Examiner*—William M. Treat
*Assistant Examiner*—Zarni Maung
*Attorney, Agent, or Firm*—Anne E. Saturnelli; David A. Dagg; Arthur W. Fisher

[57] ABSTRACT

In a computer system, an improved technique detects and executes cross-domain calls in an application program. The invention determines whether a branch target address falls within a reference address range within a first domain. If it does, the invention executes the call by determining a called address in a second domain corresponding to the target address in the first domain, e.g., by mathematically manipulating the target address. The invention then accesses the called address and executes the code stored therein. The invention may be used in detecting and executing cross-domain calls from an application program executing by interpretation in an emulated computer system having a first architecture (e.g., "CISC"), where the calls seek execution of specified system services functions executable directly in a computer system having a second, different architecture (e.g., "RISC"). The invention also may be used in a computer system having multiple processors of heterogeneous architectures.

24 Claims, 5 Drawing Sheets

METHOD AND APPARATUS FOR DETECTING AND EXECUTING CROSS-DOMAIN CALLS IN A COMPUTER SYSTEM

This application is a continuation of application Ser. No. 08/523,917, filed Sep. 6, 1995 which is a continuation of application Ser. No. 08/207,453, filed Mar. 8, 1994.

FIELD OF THE INVENTION

This invention relates generally to computer systems, and more particularly to techniques for detecting and executing cross-domain calls. The invention finds particular utility for operating an emulation system to execute programs on a computer system having an architecture other than that for which the programs were written. The invention also finds particular utility in a multi-processor computer system in which the processors are of different architectures.

BACKGROUND OF THE INVENTION

A computer architecture can be defined as the attributes of a computer established at the hardware and machine language level, in contradistinction to those available for manipulation at a higher software level, e.g., by application programs. Generally speaking, architectural attributes include, e.g., an instruction set, instruction format, operation codes, addressing modes, register locations, and memory locations, including those that define machine state.

CISC and RISC are two types of architectures prevalent today. "CISC" stands for complex instruction set computing, e.g., as embodied in IBM™-compatible personal computers incorporating 80X86 processors from Intel Corporation. CISC machines are characterized by variable-length instruction formats, a large number of addressing modes, small-to-medium-sized register files, register-to-memory (or memory-to-memory) instructions, and microcoded execution of instructions. "RISC" stands for reduced instruction set computing, e.g., as embodied in computers incorporating ALPHA AXP™ processors from Digital Equipment Corporation. RISC architectures are characterized generally by simple, fixed-length instruction formats, a small number of addressing modes, large register files, a load-store instruction set model, and direct hardware execution of instructions.

It is often desirable to execute programs on computers conforming to one type of architecture, though the programs were designed for execution on machines conforming to another, different type of architecture. For example, programs designed for execution on CISC computers may need to run on RISC machines. In order to do so, some form of "software" bridge must be furnished between the two architectures.

A complication in providing that software bridge arises from the need in many CISC (e.g., 80X86) programs for system services functions ("SSF") to support program execution. SSF typically include (i) basic input/output system ("BIOS") functions for controlling video, disk access, system clock, etc., and (ii) operating system functions for providing program loading and unloading, network control operations, file services, etc.

During execution, the application programs frequently "call" SSF's, i.e., branch to SSF routines normally provided, e.g., by the CISC system software. Each branch (i.e., change from sequential program flow indicative of a call) will specify, directly or indirectly, a target address to which control is to pass.

For example, the application programs can include branches in the form of interrupts. The interrupts specify interrupt numbers for use as indexes into an interrupt vector table ("IVT") identifying target addresses of SSF routines. Control is passed to the SSF routine designated by the interrupt number. Applicable standards for IBM™-compatible personal computers specify SSF routines accessible via particular interrupt numbers. Other form of branches include branch instructions and jump instructions, which typically directly specify target addresses.

The software bridge for enabling cross-architecture execution of application programs can be furnished in a number of different ways. First, the application program can be translated into a new program that executes, e.g., on the RISC computer. This can be a time-consuming, costly procedure, which may require the authorization of an owner of any intellectual property rights in the program. Second, in the alternative, an RISC computer can be used to emulate, preferably transparently, the CISC architecture, thereby enabling it to execute CISC application programs.

During emulation, the RISC computer creates the illusion of a CISC machine for program execution purposes. Creating that illusion requires emulation of the operating environment of the CISC machine, including its processor, system software, peripheral hardware, and memory; in short, emulation of all components and resources that the application program would "expect" to be available to it during execution.

After creating that illusion, the RISC computer executes the application program using a process called "interpretation." In other words, the RISC computer decodes and parses the application program to obtain state information that would result from executing the program on a CISC machine, and then identifies and executes corresponding code in the RISC system that performs equivalent operations.

While conventional emulation systems are generally suited to their intended purposes, they encounter certain limitations and drawbacks. For example, conventional emulation systems can have difficulties in efficiently executing SSF called by application programs.

Called SSF routines can be provided during program execution either in the CISC instruction set for execution via translation or interpretation, or in the instruction set of the RISC architecture for direct execution. Direct execution of the SSF routines in the RISC computer can realize performance and other gains over the other techniques because it is faster than interpretation, and more economic than translation.

Execution of the application programs via interpretation with direct execution of called SSF routines requires a mechanism to detect when the application programs transfer control for execution of the SSF routines. The detection mechanism must be able to distinguish calls that seek to pass control to the SSF routines (i.e., between the CISC emulation and the native RISC machine) from those that merely seek to pass control to other routines in the same application program. The former are referred to as cross-domain calls, with the CISC emulation representing one domain and the RISC machine the other.

Detecting cross-domain calls is significant in contexts other than emulation systems. For example, many computer systems have multiple processors, e.g., within a single enclosure or disposed remotely and connected by communication links. Increasingly, the processors within the system are of different architectures, thus the system can be said to embody two or more (i.e., multiple) domains. To take advantage of such a heterogeneous environment, the processors sometimes make cross-domain calls for execution of routines by other processors in the system. It would be desirable to provide a mechanism for efficient and reliable detection and execution of such cross-domain calls.

SUMMARY OF THE INVENTION

The invention resides in an improved technique for detecting calls from a first domain to a second domain by providing a reference address range within the first domain indicative of a cross-domain call. If the target address of any branch falls within the reference address range, the invention executes the call as a cross-domain call. In order to execute the cross-domain call, the invention determines a called address in the second domain corresponding to the target address in the first domain by mathematically manipulating the target address. The invention then accesses the called address and executes the code stored therein in the second domain. The invention can then return the results of executing that code via a return cross-domain call to the program executing in the first domain that invoked the call.

The mathematical manipulation of the target address can take any of a variety of different forms. For example, the arithmetic difference between the target address and one of the boundaries of the predetermined range can be calculated and used as an offset into a second predetermined address range in the second domain to yield the called address.

Alternatively, an arithmetic operation can be performed on the target address, such as the addition, substraction, or multiplication of the target address (which is treated as an integer for these purposes) by a constant. Another embodiment uses a transformation polynomial on the target address to yield the called address.

An illustrative embodiment of the invention uses a "phantom" table, called a "cross-domain reference space" or "CRS" to establish the reference address range. The CRS can have a plurality of independently addressable memory locations, for example, the smallest permitted by the architecture (e.g., a single byte), each corresponding to a callable address in the second domain. The contents of the CRS are preferably not used in the invention, hence, the designation of that table as "phantom."

To determine whether a particular call is a cross-domain call in this embodiment, the branch target address of the call is used as a pointer to designate a corresponding address of an entry in the CRS, either directly or via an interrupt vector table. If a corresponding entry in the address space of the CRS exists for the target address, the call is treated as a cross-domain call.

Then, an offset is calculated, which equals the difference between the designated CRS address and, e.g., the lowest address of the CRS. This offset is then used in accessing a second-domain address table.

The second-domain address table preferably has the same number of entries as the CRS, each of which containing a representation of an address within the second domain's address space of code to be executed. The calculated offset in the CRS can be used to access the second-domain address table, e.g., by adding it to the lowest address within that table, and then using the resulting sum as an address of an entry therein to be accessed.

In an illustrative implementation of this embodiment, the second-domain address table is a function address table ("FAT"), and the accessed entry contains the address of a called system services routine stored in a system services function space ("SSFS").

By practicing this embodiment, the program that invoked the call can be executed (e.g., executed in an emulated environment by interpretation) on a first computer system having an architecture different from that for which the program was written. Moreover, the system services functions required by that program can be directly executed, e.g., on the computer system hosting the emulation, even though it has a different architecture.

This embodiment of the invention can achieve a number of additional advantages. For example, cross-domain detection using the CRS consumes, e.g., only one byte of address space in the emulated CISC domain per each systems function, and, even then, the CRS need not store data or code in that address space for purposes of the invention. Where the emulation is of an 80X86 machine with its notoriously limited address space for conventional memory, this feature of the invention can be of particular benefit.

Another significant advantage is that this embodiment requires neither modification of the application programs being executed, nor advanced interpretation of the program.

Yet another advantage is that this embodiment provides the ability to readily support commodity personal computer hardware, e.g., graphics boards and other devices connectable via an expansion bus to a computer system of a non-conforming architecture.

BRIEF DESCRIPTION OF THE DRAWINGS

For a fuller understanding of the nature of the invention, reference should be had to the following detailed description taken in connection with the accompanying drawings, in which.

DETAILED DESCRIPTION OF PREFERRED EMBODIMENT

Figure 1:
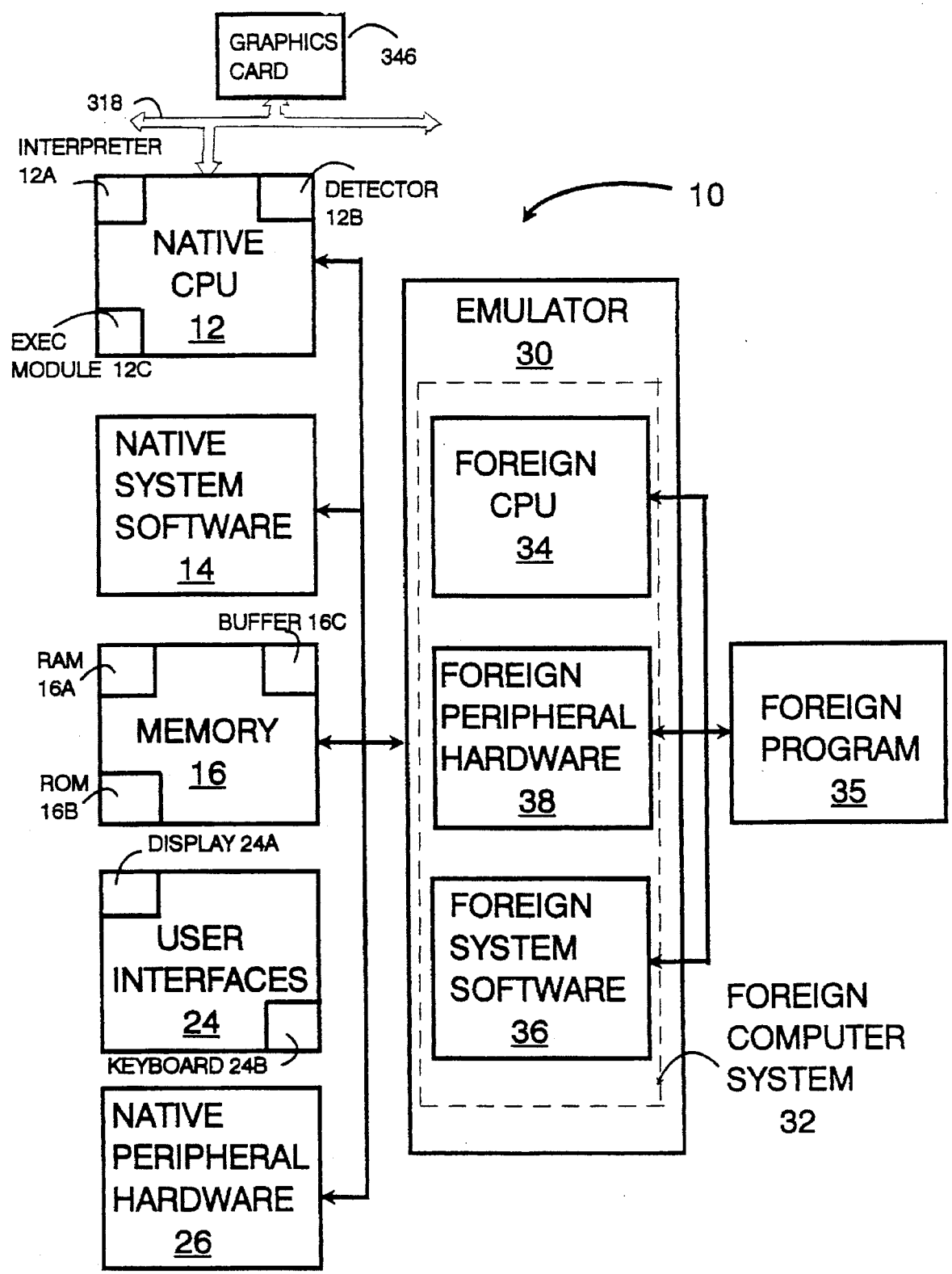
FIG. 1 is a block diagram of a computer system including an emulator for executing application programs in accordance with the invention.

FIG. 1 shows a host computer system 10 in accordance with the invention. The computer system 10 embodies a first architecture, and has a conventional CPU 12, system software 14 (including, e.g., an operating system) for controlling operation of the system 10, and a memory 16.

The host computer system 10 also includes conventional user interfaces 24 and peripheral hardware 26 coupled to the CPU 12. The user interfaces 24 include, e.g., a display or monitor 24A and a keyboard 24B for providing displayed outputs and for enabling a user to enter commands and data, respectively. The peripheral hardware 26 includes, e.g., conventional disk controllers, keyboard controllers and input/output ("I/O") ports (not separately shown).

The host computer 10 further includes an emulator 30 implemented preferably in software executable by the CPU 12 for emulating a computer system 32 embodying a second, different architecture. Conventional emulation systems are well known to those of ordinary skill in the art.

For convenience in distinguishing between the computer systems 10, 32 herein, the host computer system 10 and its components and code written for the first architecture shall be referred to as "native." Analogously, the emulated system 32 and its components and code written for the second architecture shall be referred to as "foreign."

The second system 32 essentially is an "illusion" created by the emulator 30, of a foreign CPU 34 for executing foreign code, e.g., at least one, foreign application program 35. The emulator 30 also generates an emulation of foreign system software 36 for controlling operation of the computer system 32, and an emulation of foreign peripheral hardware 38.

The application program 35 comprises a sequence of instructions (i.e., lines of code) conforming to an instruction set mandated by the second architecture, which are adapted for execution on the foreign CPU 34. The application program 35 includes branches (i.e., changes from sequential program flow) for passing control to one or more SSF routines, as described below.

In an illustrative application of the invention, the host computer system 10 can be a RISC machine, such as, e.g., the ALPHA-AXP-based computer mentioned above, and the foreign computer system 32 can be a CISC machine, such as, e.g., the 80X86-based machine also mentioned above (often referred to as an "IBM compatible computer", where IBM is a trademark).

Figure 2:
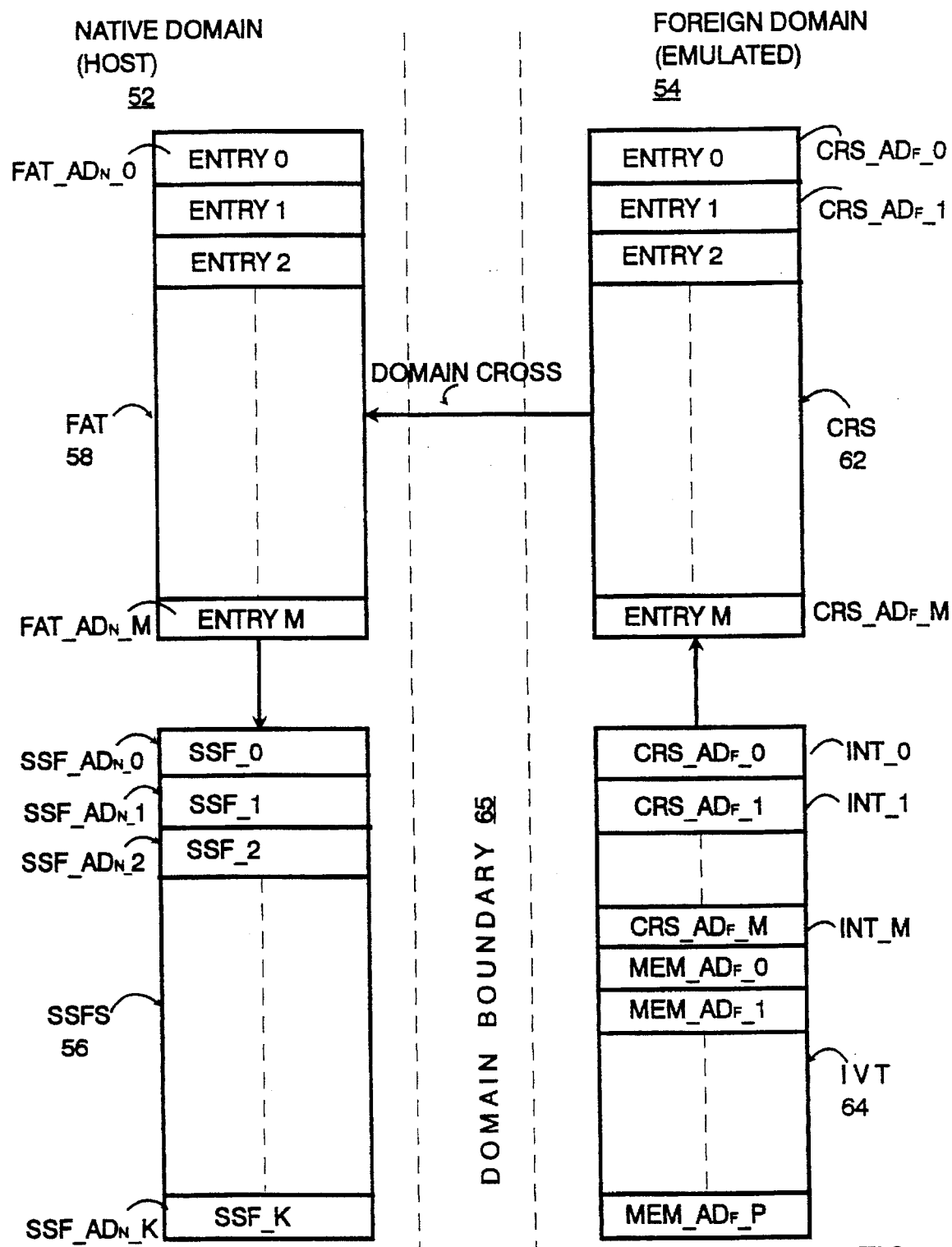
FIG. 2 is an illustrative representation of the structure and mapping of the address space of the memory of FIG. 1, showing those aspects pertaining to detection and execution cross-domain calls.

FIG. 2 depicts memory 16 as including a native domain address space 52 and a foreign domain address space 54. The native domain address space 52 has privileged access from computer system 10 of the native domain. The foreign domain memory space 54 has privileged access from the computer system 32 provided by emulator 30. The native domain address space 52 includes a system services function space ("SSFS") 56, and a function address table ("FAT") 58. The foreign domain address space 54 includes a cross-domain reference space or table ("CRS") 62, and an interrupt vector table ("IVT") 64.

First, the native domain address space 52 will be discussed in greater detail. The SSFS 56 stores the SSF's as entries designated SSF_0, SSF_1, . . . , and SSF_N; each entry is uniquely identified within the native domain address space 52 by a corresponding address SSF_AD$_N$_0, SSF_AD$_N$_1, . . . , and SSF_AD$_N$_K, where "K" is a positive integer.

The FAT 58 has a number of entries designated 0 through M, where "M" is a positive integer, each storing a representation of one of the SSFS addresses SSF_AD$_N$_0, SSF_AD$_N$_1, . . . , or SSF_AD$_N$_K of a corresponding entry SSF_0, SSF_0, . . . , or SSF_K in the SSFS 56. Preferably, "M" is less than or equal to "K", the number of system services functions represented by entries in the SSFS 56. ("M" can be less than "K" where a sub-set of the SSF are to be made available for a particular program's execution.) The FAT 58 occupies a range of addresses FAT_AD$_N$_0 to FAT_AD$_N$_M within the native domain address space 52.

With respect now to the foreign domain address space 54, the CRS 62 has a number of entries, designated entry 0 through entry "M," located at respective addresses CRS_AD$_F$_0 through CRS_AD$_F$_M. Preferably, each entry 0–M occupies the smallest independently accessible block of locations in the foreign domain 54, e.g., a single byte.

Moreover, the number of entries 0–M in the CRS 62 is equal to the number of entries 0–M in the FAT 58, i.e., "M".

In other words, the addressable locations in the FAT 58 and CRS 62 are allocated in matched pairs, each pair corresponding to one of the SSF's available for implementation in the system 10.

The CRS 62 is used as a reference table only; therefore, no code is required by the invention to be stored in the entries 0–M of that table. Essentially, the CRS 62 is the foreign-domain counterpart of the native-domain's FAT 58, and is used only in deriving a pointer into the FAT 58. Indeed, the portion of the emulated domain address space 54 reserved for the CRS 62 can be used independently of the invention for storing data or code required for other applications.

The IVT 64 contains a number of entries designated CRS_AD_0, CRS_AD_1, . . . , CRS_AD_M, each corresponding to a respective interrupt number INT_0 through INT_M. Each IVT entry CRS_AD_0, CRS_AD_1, . . . , CRS_AD_M, is accessible using the corresponding interrupt number as a pointer into the IVT 64. Each entry CRS_AD_0, CRS_AD_1, . . . , CRS_AD_M represents an address of a corresponding entry in the CRS 62.

The IVT 64 can also have entry locations containing branch target addresses MEM_AD_0, MEM_AD_2, . . . , MEM_AD_P that do not fall within the range of addresses CRS_AD_0 to CRS_AD_M within the CRS 62, and thus do not require cross-domain calls. For example, the addresses MEM_AD_0, MEM_AD_2, . . . , MEM_AD_P may be target addresses for calls for routines within the application program 35 (FIG. 1) itself.

A. Initialization and Set-Up of Tables

Figure 3:
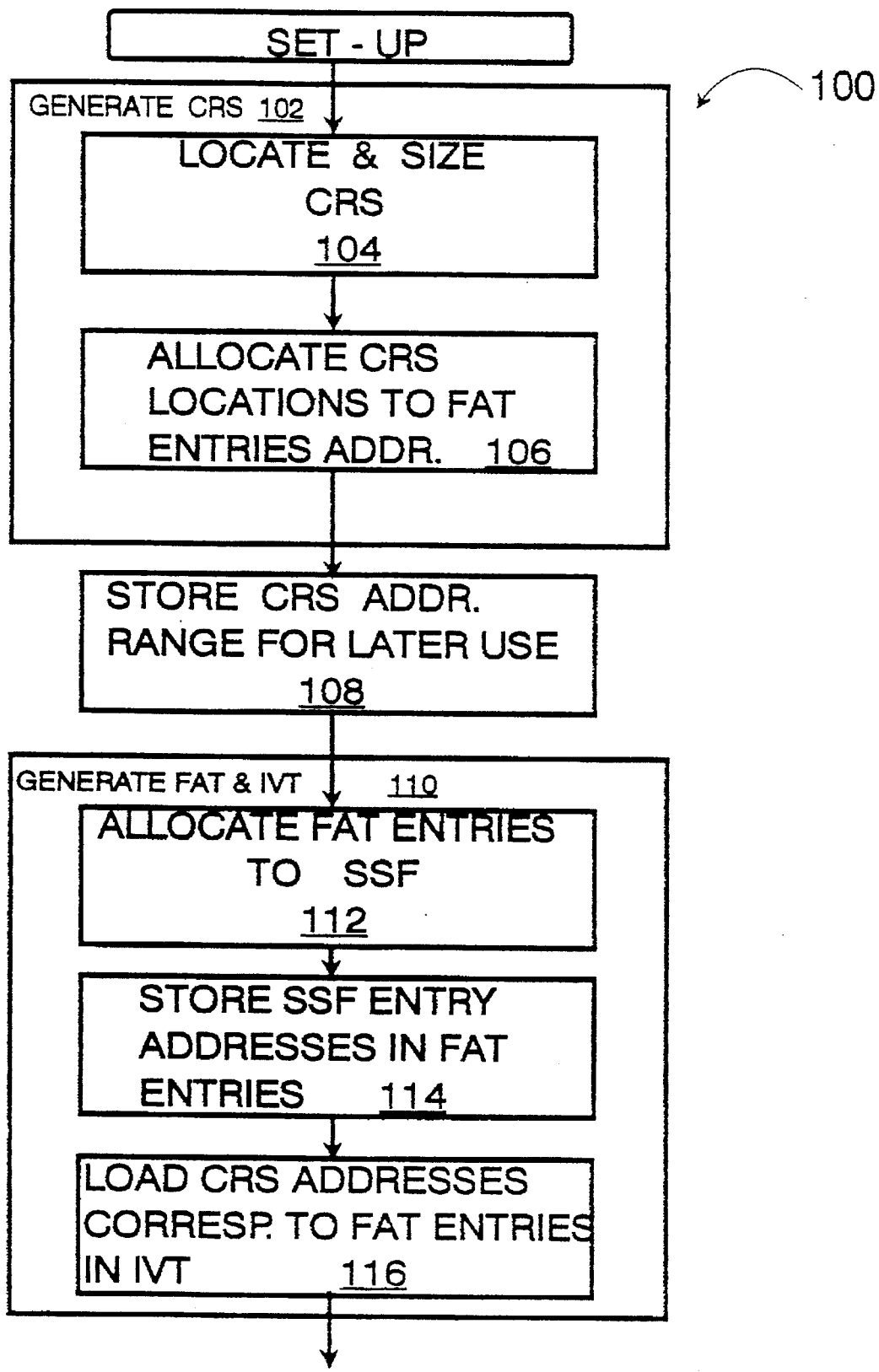
FIG. 3 is a block diagram of a method of initializing the computer system of FIG. 1 for cross-domain call detection and execution by setting-up the tables of FIG. 2.

FIG. 3 shows a method 100 of intializing the computer system 10 (FIG. 1) to set-up the tables 56, 58, 62, 64 (FIG. 2).

Block 102 generates the CRS 62 by performing a number of sub-steps. Sub-block 104 locates and sizes the CRS 62 by reserving a range of addresses CRS_AD$_F$_0 through CRS_AD$_F$_M (i.e., a section) of the foreign domain address space 54 for the CRS and determining the number of bytes required in the address range, e.g., a single byte per address. Sub-block 106 allocates locations in the CRS 62 to FAT entries. For example, each single-byte location in the CRS 62 corresponds to a FAT entry at which is stored an address (e.g., a 32-bit address) in the native address space conforming to the architecture of the computer system 10. The stored address is of an entry point (e.g., first line of code or first instruction) of an SSF routine.

The foregoing arrangement achieves a number of advantages. For example, the CRS 62 can be configured to be of minimal size, e.g., having only a single byte per SSF instead of bytes sufficient to hold an entire native domain address, e.g., 32 bits, for each SSF.

Block 108 stores the address range of the CRS 62 for later use, e.g., in buffer 16C (FIG. 1) of memory 16 (FIG. 1).

Block 110 generates the FAT 58 and IVT 64. Sub-block 112 allocates FAT entries to individual SSF's. Sub-block 114 stores SSF, entry addresses in corresponding FAT entries. Sub-block 116 loads the reference addresses corresponding to individual CRS 62 entries into corresponding entries in the IVT 64, which are accessed via corresponding interrupt numbers.

B. Detection and Execution of Cross-domain Calls.

Figure 4:
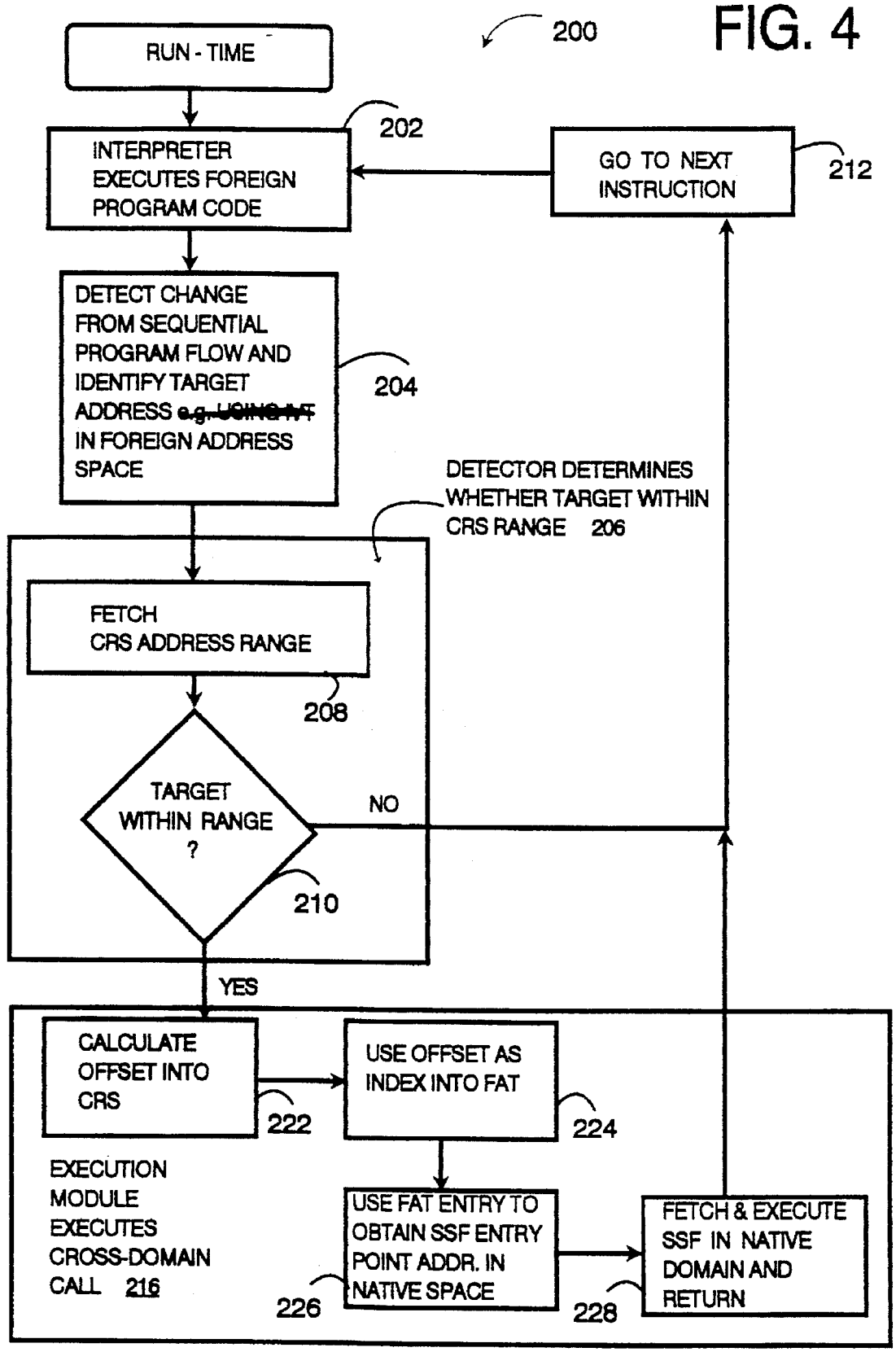
FIG. 4 is a block diagram of a run-time method for detecting and executing cross-domain calls in the computer system of FIG. 1.

FIG. 4 depicts a run-time method 200 for executing the program 35 after the FAT 58, CRS 62, and IVT 64 have been set-up as just described. Block 202 uses a conventional interpreter 12A (FIG. 1) implemented preferably by CPU 12 (FIG. 1) to execute the foreign program code by interpretation.

Block 204 detects any change from sequential program flow (referred to herein as a "branch") and identifies a target address for the detected branch (i.e., the address of a next instruction to be executed following the branch). In other words, the method 200 traps any attempted transfer of control to a non-sequential instruction. If no branch is detected, block 202 continues to execute the program until completion of execution thereof.

On detection of a branch, in block 206, a detector 12B preferably implemented by CPU 12 (FIG. 1) determines whether the target address for that branch is within the CRS range of addresses $CRS\_AD_F\_0$ through $CRS\_AD_F\_M$. The detector 12B performs a number of operations represented by sub-blocks. Sub-block 208 fetches the CRS address range $CRS\_AD_F\_0$ through $CRS\_AD_F\_M$ from buffer 16C of memory 16, and sub-block 210 tests whether the branch target address is within that range.

Preferably, method 200 uses a single range address comparison in detecting cross-domain calls, rather than, e.g., a comparison of the branch target address with multiple, different address ranges.

If the target address is not within the CRS range, block 212 increments the program counter function of the CPU 12, and the next instruction is executed in block 202.

On the other hand, if the branch target address is within the range $CRS\_AD_F\_0$ through $CRS\_AD_F\_M$, in block 216, an execution module 12C (FIG. 1) preferably implemented by CPU 12 takes control of executing a cross-domain call. The execution module 12C causes program execution by interpretation to stop, jackets the cross-domain call so as to pass parameters (e.g., register identifications, etc.) conforming to the conventions of the called domain, and generally enables direct execution of a called system services routine.

Within block 216, the method 200 includes a number of sub-blocks. Sub-block 222 calculates an offset into the CRS 62 equal to a difference between one of the boundary addresses (i.e., one of the first address $CRS\_AD_F\_0$ and the last address $CRS\_AD_F\_M$) of the CRS range and the branch target address within the CRS 62.

Sub-block 224 uses the calculated offset as an index into the FAT 58 to access a corresponding FAT entry 0–M. To illustrate, the offset can be calculated as the difference between the target address and the boundary address $CRS\_AD_F\_0$. Then, the offset can be used as an index into the FAT 58. For example, the offset from the CRS 62 can be scaled as necessary, e.g., multiplied by the ratio of the entry size (in number of bytes) in the FAT to the entry size in the CRS. The resulting scaled offset can be added to the first address $FAT\_AD_N\_0$ of the FAT 58 to yield a FAT address of a corresponding FAT entry.

Next, sub-block 226 uses the FAT entry identified by the index as an address in the native domain address space 52 of an entry $SSF\_0$–$SSF\_K$ in the SSFS 56. The SSFS entry so identified is the SSF entry point of a called SSF routine.

Block 228 fetches and executes the called SSF routine starting with the identified SSF entry point. Any results from the execution of the SSF routine can be returned to the application program 35 via a return cross-domain call with appropriate jacketing furnished by the CPU 12 (FIG. 1). Whether or not a return call is required, the method 200 next passes control to block 212 for continued execution of foreign code of the application program 35 by interpretation.

C. Illustrative Implementation.

With renewed reference to FIGS. 1–4, an illustrative implementation of the invention will now be described. A particular SSF can provide display services, and can be stored in the SSFS 56, e.g., at entry $SSF\_1$ having address $SSF\_AD_N\_1$. An entry (e.g., entry 1) in FAT 58 is allocated to $SSF\_1$, and contains $SSF\_AD_N\_1$ at an address therein. The address of that entry is identifiable using, e.g., an offset derived from the relative location of a branch target address within the address range $CRS\_AD_F\_0$–$CRS\_AD_F\_M$ in the CRS 62.

In this example, CRS entry 1 bearing address $CRS\_AD_F\_1$ can correspond to the display services SSF. A branch included in the application program can call the display services SSF. To do so, the branch will specify a target address provided directly in a branch or jump instruction or indirectly via the IVT 64. The branch target address will be $CRS\_AD_F\_1$. The offset can be computed by subtracting the lowest address in the CRS 62, i.e., $CRS\_AD_F\_0$, from the branch target address, to yield an offset of one.

The call for the display services SSF requires a domain cross for direct execution of that SSF, i.e., the call crosses the domain boundary 65 between the foreign domain address space 54 and the native domain address space 52.

The offset can be used to identify a corresponding entry in the FAT 58, e.g., by using the offset as an index into the FAT 58, as described above. Where the scaled offset equals one, and this value is added to the lowest address of the FAT 58, this approach provides the address $FAT\_AD_N\_1$ of an entry in the FAT 58 whose contents are the address, e.g., $SSF\_AD_N\_1$, of an entry point of the display services SSF. The display services SSF can then be executed.

Figure 5:
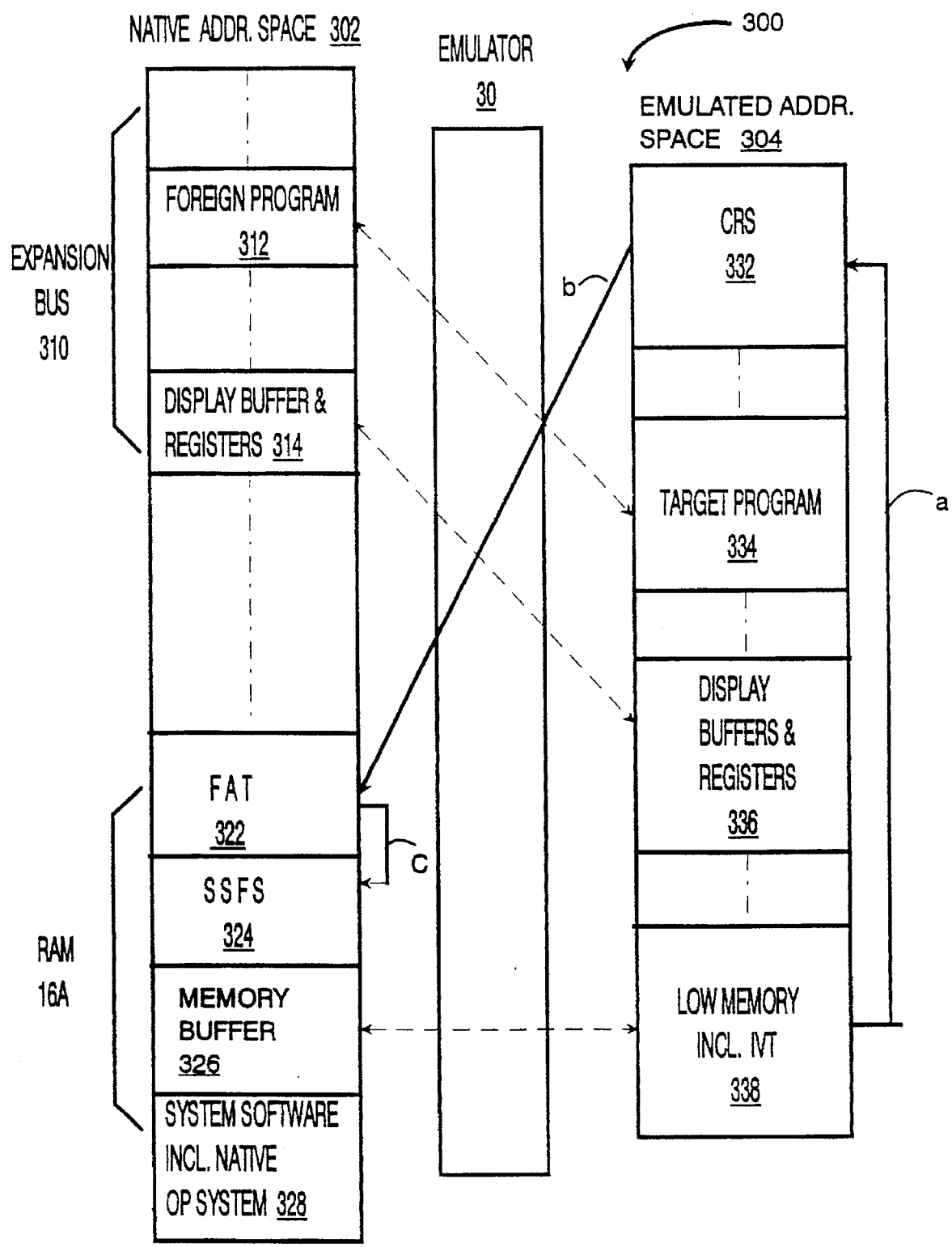
FIG. 5 is a more detailed representation of the address space of FIG. 2 in accordance with an illustrative implementation of the invention.

This implementation can be better understood with further reference to FIG. 5. That diagram depicts an implementation of a memory address space 300 with mappings between a native address space 302 and an emulated address space 304 analogous to FIG. 2. The native address space 302 has uniquely specified addresses assigned to all memory locations of the native domain used for direct execution by computer system 10 (FIG. 1). The emulated address space 304 is generated by an emulator 30 and has uniquely specified addresses assigned to all memory locations accessible by the emulated computer system 32 (FIG. 1).

Addressing within the native and emulated address spaces 302, 304 preferably conforms with the respective architectures of the computers 10, 32 accessing those spaces. The native address space 302 includes a space 312 for storing a foreign program, e.g., code for controlling the display 24A (FIG. 1) and data related thereto, and display buffers and registers 314. The addresses spaces 312, 314 can be assigned, e.g., to portions of native address space 302 located on a graphics card 346 (FIG. 1) connected to the native CPU 12 by means of an expansion bus 318.

The native address space 302 also includes a FAT 322, SSFS 324, memory buffer 326 and an address space 328 for system software, including native operating system. The address spaces 322–328 can be assigned to random access memory ("RAM") 16A of a computer system, e.g., system 10 of FIG. 1.

The emulated address space 304 includes a CRS 332, an address space 334 for a target program, a display buffers and registers space 336 for graphics code and data, and an address space 338 assigned to low memory, including an IVT. The address space 334 for the target program is assigned to a read-only memory 16B (FIG. 1) that contains the foreign program as the target for execution by interpretation, i.e., a mapped version of the foreign program. Likewise, the space 336 contains the contents of the display buffers and registers 314 in a manner accessible by the emulator 30.

A call can take the form of a standard interrupt for display services referred to as INT 10. The IVT within address space 338 can contain a reference address in the CRS address space 332 corresponding to INT 10, as illustrated by arrow "a".

The reference address can be used to obtain an offset, which permits access to a corresponding entry in the FAT address space 322 as illustrated by arrow "b" to obtain an address therein in the native address space 302.

The fetched address from the FAT address space 322 can then be used in accessing the SSFS 324 as illustrated by arrow "c" to fetch therefrom an entry point, e.g., a first instruction or line of code, for the display services. The display services are then directly executed, and control is returned to the emulated address space 304 for renewed execution of the target program by interpretation.

D. Alternative Embodiments.

The above-described FIGS. 1–5 depict the invention as practiced with regard to interrupt handling for branching to SSF's designated by an IVT using an offsets to determine target addresses for cross-domain calls.

The invention can be practiced more generally by detecting cross-domain calls resulting from branch or jump instructions or any other events or conditions causing branches for execution of routines in a cross-domain.

Also, the invention need not use an offset to translate a branch target address in one domain into an target address in another domain. Instead, the branch target address in the CRS can be mathematically manipulated to yield the other address.

The mathematical manipulation of the branch target address can take any of a variety of different forms. For example, an arithmetic operation can be performed on the branch target address, such as the addition, subtraction, or multiplication of the branch target address (which is treated as an integer for these purposes) by a constant to yield a corresponding address in the native domain. Another embodiment can use a transformation polynomial on the target address to yield the other address.

In addition to the emulation applications discussed above, the invention can find particular utility in multi-processor computer systems in which the processors are of different architectures. In such an application of the invention, a first processor can be deemed the native CPU 12 of FIG. 1, and a second processor can be deemed the foreign processor 34, and the invention can be carried out as shown and described without regard to direct execution verses execution by interpretation, and without regard to emulation.

The invention has been shown and described hereinabove with respect to an illustrative embodiment thereof. The terms and expressions that have been employed are used as terms of description and not of limitation. It should be understood by those skilled in the art that the foregoing and various other changes, omissions, additions and substitutions in the form and detail of the illustrative embodiment may be made without departing from the spirit and scope of the invention.

What is claimed is:

1. A method executed in a computer system for detecting and executing a call from a first program associated with a first architectural domain to a second program associated with a second architectural domain, said first architectural domain being characterized by a first architecture including a first instruction set, said second architectural domain being characterized by a second, different architecture including a second instruction set, said first program being adapted for execution in said first architectural domain and including instructions from said first set of instructions, said second program being adapted for execution in said second architectural domain and including instructions from said second set of instructions, said method comprising the steps of:

detecting whether said call specifies a target address within a cross-domain reference address range in said first architectural domain, said cross-domain reference address range indicating a range of addresses of cross-domain calls;

responsive to the target address being within said cross-domain reference address range, determining a called address in said second architectural domain corresponding to said target address in said first domain using said target address; and fetching and executing instructions of said second program specified by said called address in said second architectural domain, said computer system executing said first program within said first architectural domain, and detecting and executing said call and instructions included in said second program associated with said called address.

2. The method of claim 1, wherein said cross-domain reference address range includes first and second boundary addresses defining said cross-domain reference address range, and said determining step includes the step of using said target address to determine said called address by performing the steps of:

determining an offset between said target address and one of said first and second boundary addresses, and using said offset within a second predetermined address range in said second architectural domain to identify said called address at which said second program is stored.

3. The method of claim 1, wherein said determining step includes the step of performing an arithmetic operation on said target address to yield said called address, said arithmetic operation being one of addition, subtraction, or multiplication of said target address by a constant.

4. A method executed in a computer system for detecting and executing cross-domain calls in an application program comprising a plurality of instructions of a first instruction set associated with a first computer architecture, at least one of said cross-domain calls including a branch, said branch being a non-sequential change in a predetermined flow of execution of instructions of said application program, said method comprising the steps of:

determining whether a target address specified as a target of said branch included in said application program falls within a cross-domain reference address range within a first domain indicating a cross-domain call to a routine in a second domain;

if said target address falls within said cross-domain reference address range, executing said cross-domain call specifying said target address by determining a called address in said second domain corresponding to said target address in said first domain by mathematically manipulating said target address; and accessing said called address in said second domain and executing instructions stored therein of a second instruction set characteristic of a second computer architecture.

5. A method performed in a computer system for executing an application program that includes instructions of a first instruction set associated with a first computer architecture, the method comprising the steps of:

executing a portion of said application program by interpretation in a computer system having a second computer architecture, said application program having at least one call for executing a system services function routine including instructions selected from a second instruction set associated with said second architecture;

determining whether a target address of a next instruction to be executed, falls within a cross-domain reference address range of a first domain;

if said target address falls within said cross-domain reference address range, executing said call by determining a called address in a second domain corresponding to said target address in said first domain by mathematically manipulating said target address; and accessing a memory location corresponding to said called address and executing said systems services routine by executing code stored at said called address.

6. A method of executing a first program on a first processor having a first architecture and being associated with a first domain, and a second program on a second processor having a second architecture and being associated with a second domain, said first program including a cross-domain call for execution of said second program, said method comprising the steps of:

executing a plurality of instructions of said first program on said first processor, said instructions being of a first instruction set associated with said first architecture;

determining whether a call is a cross-domain call by determining whether a target address specified by said call included in said first program falls within a cross-domain reference address range within said first domain;

if said call is a cross-domain call, determining a called address in said second domain corresponding to said target address in said first domain by mathematically manipulating said target address; and accessing said called address and executing said second program commencing with code stored at said called address, said code specifying instructions of a second instruction set associated with said second architecture.

7. The method of claim 6, wherein said step of determining whether a call is a cross-domain call further comprises the steps of:

establishing a cross-domain reference table having a plurality of independently addressable memory locations, each corresponding to a callable address in said second domain and to one of said addresses in said cross-domain reference address range;

determining whether said target address specifies one of said locations in said cross-domain reference table.

8. An apparatus for detecting and executing a call from a first program being executed in a first domain to a second program in a second domain, said first program including instructions of a first instruction set and said second program including instructions of a second instruction set, said apparatus comprising:

means, operable during execution of said first program, for detecting whether said call specifies a target address within a cross-domain reference address range in a foreign address space in said first domain;

means, coupled to said detecting means and responsive to said target address being within said cross-domain reference address range, for determining a called address in said second domain corresponding to said target address in said first domain by mathematically manipulating said target address; and means for fetching and executing said second program instructions located at said called address.

9. The apparatus of claim 8, wherein said cross-domain reference address range includes first and second boundary addresses defining boundaries of said cross-domain reference address range, and said determining means includes means for mathematically manipulating said target address that includes:

A) means for determining an offset between said target address and one of said first and second boundary addresses, and B) means for using said offset within a second predetermined address range in said second domain to identify said called address at which said second program code is stored.

10. The apparatus of claim 8, wherein said determining means mathematically manipulates said target address by performing an arithmetic operation on said target address to yield said called address.

11. The apparatus of claim 8, further including a plurality of memory locations coupled with said fetching and executing means for storing system services function routines comprising said second program, said called address being assigned to said memory locations.

12. An apparatus for detecting and executing a call from a first program including instructions of a first instruction set executable in a first domain to a second program including instructions of a second instruction set executable in a second domain, said apparatus comprising:

a cross-domain reference space having a plurality of independently addressable memory locations in said first domain, each of said plurality of independently addressable memory locations corresponding to a callable address in said second domain;

means coupled to said cross-domain reference space and operable during execution of said first program, for determining whether a branch target address indicated by said first program falls within said cross-domain reference space indicating a cross-domain call, said determining means identifying a first of said plurality of addresses in said cross-domain reference space as corresponding to said branch target address;

a second-domain address table having a plurality of entries, each of said plurality of entries storing a callable address in said second domain;

means, responsive to said first address in said cross-domain reference space, for designating an entry in said second-domain address table;

means, coupled to said second-domain address table, for fetching an instruction of said second program stored at a code-storage location identified by a data value stored in said entry of said second-domain address table; and means, coupled to said fetching means, for executing said instruction.

13. The apparatus of claim 12, further comprising an interrupt vector table for providing said branch target address in response to an interrupt.

14. The apparatus of claim 12, wherein said second domain address table includes entries corresponding to system service functions and said second program comprises one of said system services functions.

15. The apparatus of claim 12, wherein said code-storage location stores a display services function routine included in said second program, and said code-storage location is provided by a graphics card.

16. In a computer system having a native architecture comprising a native domain and including a processor for executing a plurality of system service function routines comprising instructions of a native instruction set, and for emulating a foreign architecture comprising a foreign domain and for executing an application program in said foreign domain, said application program comprising instructions of a foreign instruction set adapted for execution within said foreign domain and not being capable of direct execution in said native domain, a method executed in a computer system for detecting and executing a plurality of cross-domain calls from said foreign domain to said native domain included in said application program wherein one of said cross-domain calls is to execute one of said system service function routines in said native domain, said method comprising the steps of:

obtaining a target address within said foreign domain corresponding to a next instruction to be executed, said target address being indicated by said call;

determining whether said target address corresponds to one of a plurality of foreign-domain addresses within a foreign-domain address range associated with a cross-domain reference address space, said cross-domain reference address space indicating a range of foreign-domain addresses corresponding to cross-domain calls; determining a foreign-domain address offset of said target address with respect to a foreign-domain boundary address included within said foreign-domain address range in response to determining that said target address corresponds to a foreign domain address indicating a cross-domain call;

determining a selected native-domain address corresponding to said foreign-domain address offset, said step of determining a selected native-domain address comprising the substeps of using said foreign-domain address offset to determine a native-domain address offset into a native-domain function address table associated with a native-domain address range, each of said native-domain addresses included in said native-domain address range being associated with a different one of a plurality of entries of said native-domain function address table, said foreign-domain and native-domain address ranges including a like number of addresses, and using said native-domain address offset to determine a corresponding entry in said native-domain function address table, said selected native-domain address being stored at said corresponding entry;

using said native-domain address stored at said corresponding entry as a pointer to a selected entry of a system service function table, said selected entry corresponding to said selected system service function routine, said system service function table including a plurality of entries wherein each of said system service function table entries specifies a first instruction of a corresponding one of said system service function routines; and executing a first instruction of said selected system service function routine indicated by said selected entry.

17. The method of claim 16, further including the step of using said cross-domain reference address space for storing data or code unrelated to said cross-domain calls.

18. The method of claim 16, wherein said step of determining a foreign-domain address offset comprises detecting whether a call is a cross-domain call, and, if so, jacketing said call to conform to calling conventions of said native domain.

19. The method of claim 16, wherein said application program is executed by interpretation.

20. The method of claim 16, wherein the step of obtaining a target address of a call includes the step of using an interrupt vector table including a plurality of entries each corresponding to a respective interrupt number and being accessible using an interrupt number, each of a first portion of said plurality of entries specifying a foreign-domain address within said cross-domain reference address space.

21. The method in accordance with claim 20, wherein each of a second portion of said plurality of entries of said interrupt vector table specifies an address that is not within said foreign-domain address range, and said step of determining a foreign-domain address offset includes detecting whether a call is a cross-domain call by determining whether said target address corresponds to any of said foreign-domain addresses within said foreign-domain address range associated with said cross-domain reference address space, and if said target address does not correspond to one of said foreign-domain addresses associated with said cross-domain reference address space, said call is not a cross-domain call and is executed within said foreign domain.

22. The method of claim 16, wherein said cross-domain reference address space corresponds to a cross-domain reference address table having entries, wherein each of said entries is of a size that is smaller than that required to hold a native-domain address.

23. The method of claim 22, wherein each of said function address table entries is a first size and each of said cross-domain reference address table entries is of a second size, and said step of using said foreign-domain address offset in obtaining said native-domain address offset includes the steps of:

(i) scaling said foreign-domain address offset by multiplying said foreign-domain address offset by the ratio of said first size of one of said function address table entries to said second size of one of said cross-domain reference space entries to produce a scaled offset, and (ii) adding said scaled offset to a first address of said function address table indicating a native address.

24. The method of claim 16, wherein said selected system service function routine is executed in said native domain and execution of said application program continues in said foreign domain.

* * * * *